United States Patent
Lafeer et al.

(10) Patent No.: US 10,262,313 B2
(45) Date of Patent: Apr. 16, 2019

(54) MULTI-ACCOUNT CARD

(71) Applicant: Capital One Services, LLC, McLean, VA (US)

(72) Inventors: Mohamed Lafeer, Fairfax, VA (US); Adam R. Koeppel, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/936,824

(22) Filed: Mar. 27, 2018

(65) Prior Publication Data

US 2018/0218352 A1    Aug. 2, 2018

Related U.S. Application Data

(63) Continuation of application No. 14/713,855, filed on May 15, 2015.

(60) Provisional application No. 61/994,535, filed on May 16, 2014.

(51) Int. Cl.
G06Q 20/22 (2012.01)
G06Q 20/34 (2012.01)
G06Q 20/40 (2012.01)

(52) U.S. Cl.
CPC .......... *G06Q 20/22* (2013.01); *G06Q 20/227* (2013.01); *G06Q 20/3572* (2013.01); *G06Q 20/405* (2013.01)

(58) Field of Classification Search
None
See application file for complete search history.

(56) References Cited

U.S. PATENT DOCUMENTS

| 7,594,611 | B1 | 9/2009 | Arrington, III |
| 7,860,789 | B2 | 12/2010 | Hirka et al. |
| 8,370,265 | B2 | 2/2013 | Coulter et al. |
| 2014/0058950 | A1 | 2/2014 | Gupta |

OTHER PUBLICATIONS

SSA.gov, Timeout Best Practice—Build It, Sep. 15, 2012, entire document pertitent, retrieved Nov. 9, 2018 from https://web.archive.org/web/20130524051326/http://www.ssa.gov:80/accessibility/bpl/bps/forms/timeout/default.htm# (Year: 2012).*
Woyke, Elizabeth, PayPal's Coolest Mobile Wallet Feature: The Oops Button, Nov. 1, 2011, Forbes, entire document pertitent, retrieved from https://www.forbes.com/sites/elizabethwoyke/2011/11/01/paypals-coolest-mobile-wallet-feature-the-oops-button/#7f1aa18a11d7 (Year: 2011).*

* cited by examiner

*Primary Examiner* — Peter Ludwig
*Assistant Examiner* — Gregory S Cunningham, II
(74) *Attorney, Agent, or Firm* — Finnegan, Henderson, Farabow, Garrett & Dunner, LLP

(57) ABSTRACT

A system for conducting a transaction is disclosed. The system may include one or more memory devices storing instructions and one or more processors configured to execute the instructions to receive information associated with a transaction initiated using a multi-account card. The one or more processors may be further configured to select and employ one of a plurality of transaction accounts to complete the transaction.

20 Claims, 9 Drawing Sheets

MULTI-ACCOUNT CARD

PRIORITY CLAIM

This disclosure is a continuation of and claims the benefit of priority to U.S. patent application Ser. No. 14/713,855, filed May 15, 2015, which claims priority under 35 U.S.C. § 119 to U.S. provisional Patent Application No. 61/994,535, filed May 16, 2014, and entitled "Systems and Methods for Conducting A Transaction with a Multi-Account Card." The entire contents of the aforementioned applications are incorporated herein by reference in their entireties.

TECHNICAL FIELD

The disclosed embodiments generally relate to systems and methods for conducting transactions, and more particularly, systems and methods for conducting transactions using a multi-account card.

BACKGROUND

Consumers are often forced to make quick decisions when paying for goods and/or services and sometimes question their decisions regarding purchases after they occur. For example, a consumer who purchases a product with a credit card account may question whether he or she actually wanted to use the credit card to make the purchase. The consumer may have preferred to use funds from a debit account, a different credit card account, or a rewards account to pay for the purchased product. Similarly, a consumer may decide after a recent purchase made with a debit account that the purchase should have been funded through other accounts, such as an installment loan or credit card account. In another example, a customer may use a business-expense card to make a personal purchase, or vice versa. Typically, a consumer must decide before a purchase how to fund the payment and has limited options in changing their decision after the transaction is finished.

SUMMARY

The disclosed embodiments include systems and methods that enable a consumer to use a multi-account card for transactions and select an account for completing each transaction at a later, more convenient time.

Consistent with a disclosed embodiment, a system for conducting a transaction is provided. The system may include one or more memory devices storing instructions and one or more processors configured to execute the instructions to receive information associated with a transaction initiated using a multi-account card. The multi-account card may be associated with a plurality of financial service accounts. The one or more processors may be further configured to select one of the plurality of financial service accounts for use in completing the transaction and complete the transaction with the selected financial service account.

Consistent with another disclosed embodiment, a computer-implemented method for conducting a transaction is provided. The method may include receiving, by one or more processors, information associated with a transaction initiated using a multi-account card. The multi-account card may be associated with a plurality of financial service accounts. The method may also include selecting, by the one or more processors, one of the plurality of financial service accounts for use in completing the transaction. The method may further include completing, by the one or more processors, the transaction with the selected financial service account Although disclosed embodiments are discussed primarily in the context of mobile devices and software instructions that are executed by mobile devices, other implementations are contemplated. For example, disclosed embodiments may include software instructions that are executed by a computing system, such as a desktop computer, a laptop, etc. Moreover, the configuration and architecture, etc. of the computing systems, mobile or non-mobile, are not limiting to the disclosed embodiments. Systems or components that execute software instructions to perform one or more operations consistent with the disclosed embodiments and/or store information generated and/or used by the disclosed embodiments, may be particularly configured to perform the one or more particular operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Consistent with disclosed embodiments, a customer may use a multi-account card to conduct a transaction, such as a purchase transaction with a merchant. The multi-account card may be associated with a plurality of financial service accounts. After initiating a transaction with a merchant, a financial service provider associated with the financial service accounts may authorize the transaction based on characteristics of the accounts and stored customer settings, for example, and without selection of a financial service account to be used to complete the transaction. The customer may subsequently select a financial service account to use to complete the transaction. Additionally or alternatively, the financial service provider may automatically select a financial service account to use to complete the transaction. The financial service provider may proceed to complete the transaction using the selected account.

Figure 1:
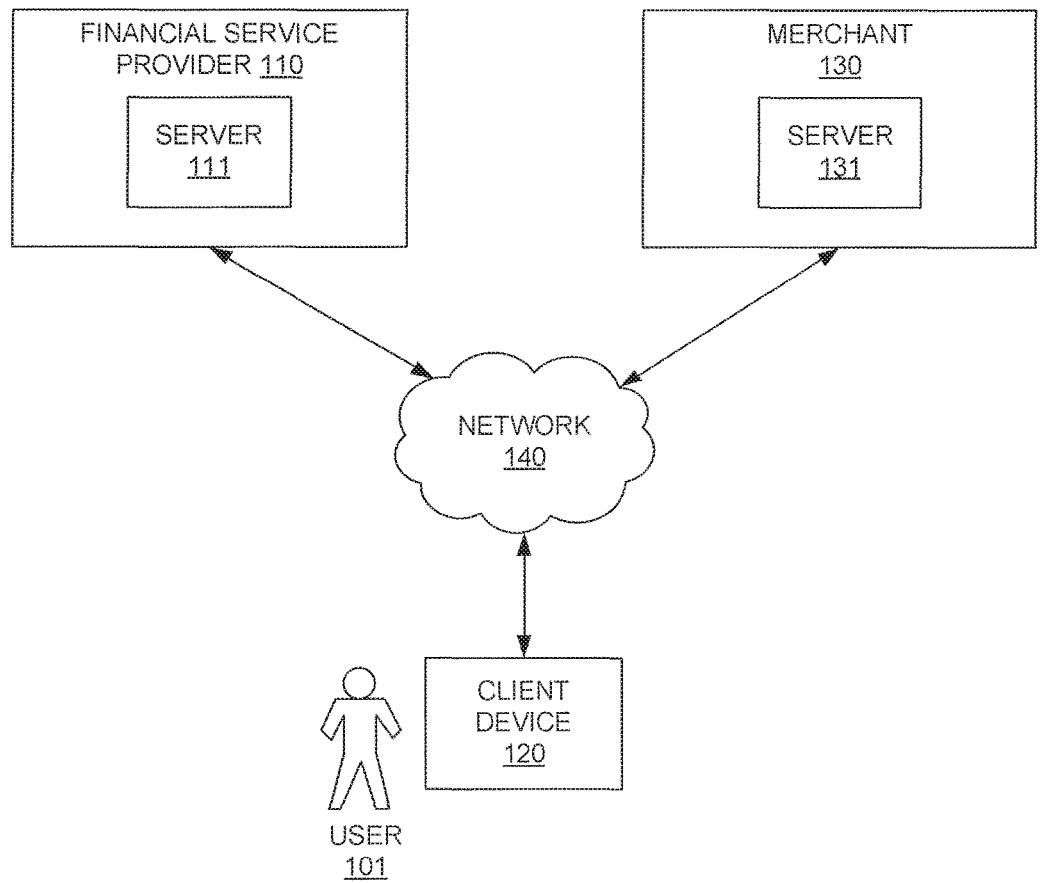
FIG. 1 illustrates an exemplary system consistent with disclosed embodiments.

FIG. 1 is a diagram illustrating an exemplary system 100 for performing one or more operations consistent with the disclosed embodiments. In one embodiment, system 100 may include a financial service provider 110, a client device 120, a merchant 130, and a network 140. The components and arrangement of the components included in system 100 may vary. Thus, system 100 may further include other components that perform or assist in the performance of one or more processes consistent with the disclosed embodiments.

Financial service provider 110 may be an entity that provides financial services. For example, financial service provider 110 may be a bank, credit card issuer, or other type of financial service entity that offers, issues, generates, provides, manages, and/or maintains financial service accounts for one or more users. Financial service accounts may include, for example, credit card accounts, checking accounts, savings accounts, business accounts, personal accounts, reward accounts, loan accounts (e.g., general (e.g., general purpose use) and specific (e.g., automobile, home improvement, mortgage, etc.)), lines of credit, promotional financing accounts, long term financing accounts, transactional credit accounts, installment loan accounts, and any other types of financial service account known to those skilled in the art. Financial service accounts may be associated with electronic accounts, such as a digital wallet or similar account that may be used to perform electronic transactions, such as purchasing goods and/or services online.

Financial service accounts may also be associated with one or more financial account products, such as a physical financial service account card (e.g., a plastic card or similar type of card product) that a user may carry on their person and use to perform financial service transactions, such as purchasing goods and/or services at a point of sale (POS) terminal. Financial account products may also include electronic type of account products, such as a mini card, or other type of product that may be configured to work with a computing system (e.g., mobile device) to operate like a physical financial account card.

In an exemplary embodiment, multiple financial service accounts may be associated with the same financial account product, referred to herein as a multi-account card. While depicted and described as a card, it should be understood that a multi-account card may refer to any financial product associated with more than one financial service account and configured to be used in one or more of the exemplary disclosed processes. Financial service provider 110 may include infrastructure and components that are configured to generate and provide financial service accounts and multi-account cards to consumers.

In addition, it should be understood that the disclosed embodiments are not limited to financial service accounts or financial service providers. That is, financial service provider 110 may, where other types of accounts or products are implemented, represent an entity that provides other types of accounts or products that may be configured, activated, and/or controlled in a manner consistent with the disclosed embodiments. One of ordinary skill in the art would understand that in such implementations, the operations of financial service provider 110 (and its components) as described herein may vary based on the type of entity and the type of accounts or products implemented by the disclosed embodiments.

In one embodiment, financial service provider 110 may include one or more computing systems that are configured to execute software instructions stored on one or more memory devices to perform one or more operations consistent with the disclosed embodiments. In one embodiment, financial service provider 110 may include server 111. Server 111 may be one or more computing devices configured to execute software instructions stored in memory to perform one or more operations consistent with the disclosed embodiments.

For example, server 111 may include one or more memory device(s) storing data and software instructions and one or more processor(s) configured to use the data and execute the software instructions to perform server-based functions and operations known to those skilled in the art and related to the function and operations of the type of businesses performed by financial service provider 110 (or other type of entity component 110 may represent). Moreover, in certain embodiments, server 111 may be configured to execute software instructions that interact with software program(s) stored and executed by client device 120, such as a mobile application that is executed on a mobile device.

Server 111 may be a general purpose computer, a mainframe computer, or any combination of these components. In certain embodiments, server 111 (or a system including server 111) may be configured as a particular apparatus, system, and the like based on the storage, execution, and/or implementation of the software instructions that perform one or more operations consistent with the disclosed embodiments. Server 111 may be standalone, or it may be part of a subsystem, which may be part of a larger system. For example, server 111 may represent distributed servers that are remotely located and communicate over a network (e.g., network 140) or a dedicated network, such as a LAN, for financial service provider 110.

Server 111 may include or may connect to one or more storage devices configured to store data and/or software instructions used by one or more processors of server 111 to perform operations consistent with disclosed embodiments. For example, server 111 may include memory configured to store one or more software programs that performs several functions when executed by a processor. The disclosed embodiments are not limited to separate programs or computers configured to perform dedicated tasks. For example, server 111 may include memory that stores a single program or multiple programs. Additionally, server 111 may execute one or more programs located remotely from server 111. For example, server 111 may access one or more remote programs stored in memory of a remote component that, when executed, perform operations consistent with the disclosed embodiments. In certain aspects, server 111 may include web server software that generates, maintains, and provides web site(s) that are accessible over network 140. In other aspects, financial server provider 110 may connect separate web server(s) or similar computing devices that generate, maintain, and provide web site(s) for financial service provider 110.

Client device 120 may be one or more computing devices that are configured to execute software instructions for performing one or more operations consistent with the disclosed embodiments. Client device 120 may be a desktop computer, a laptop, a server, a mobile device (e.g., tablet, smart phone, etc.), and/or any other type of computing device. Client device 120 may include one or more processors configured to execute software instructions stored in memory, such as memory included in client device 120. Client device 120 may include software that when executed by one or more processors performs known Internet-related communications and content display processes. For instance, client device 120 may execute browser software that generates and displays interfaces including content on a display device included in, or connected to, client device 120. The disclosed embodiments are not limited to any particular configuration of client device 120. For instance, client device 120 may be a mobile device that stores and executes mobile applications that provide financial service related functions offered by financial service provider 110 and/or merchant 130, such as a mobile banking application for controlling, configuring, and viewing information relating to financial accounts, etc. In certain embodiments, client device 120 may be configured as a particular apparatus, system, and the like based on the storage, execution, and/or implementation of the software instructions that perform one or more operations consistent with the disclosed embodiments.

In one embodiment, a user 101 may provide input to client device 120 that is used by software executed by client device 120 to perform one or more operations consistent with the disclosed embodiments. In one aspect, user 101 may be a customer or a potential customer of financial service provider 110. For instance, financial service provider 110 may generate and maintain multiple financial service accounts (e.g., credit card account, a line of credit, etc.), for user 101 and which may be associated with a multi-account card. User 101 may use the multi-account card to purchase goods and/or services online or at brick and mortar locations associated with a merchant, such as merchant 130, using one or more of the financial service accounts associated with the multi-account card.

Merchant 130 may be an entity that provides goods and/or services for purchase by consumers (e.g., individuals, businesses, etc.). While FIG. 1 shows one merchant 130 in system 100, the disclosed embodiments may be implemented in a system involving multiple merchants (e.g., a restaurant merchant, a grocery store merchant, a retail store merchant, etc.). Merchant 130 may include brick and mortar location(s) that a consumer (e.g., user 101) may physically visit and purchase goods and services. Such physical locations may include computing devices that perform financial service transactions with consumers (e.g., POS terminal(s), kiosks, etc.). They may also include back and/or front-end computing components that store data and execute software instructions to perform operations consistent with disclosed embodiments, such as computers that are operated by employees of merchant 130 (e.g., back office systems, etc.). In certain embodiments, merchant 130 may also include one or more merchants that provide electronic shopping mechanisms, such as a website or similar online location that consumers may access using a computer (e.g., client device 120) through browser software or similar software.

In one embodiment, merchant 130 may include server 131. Server 131 may be one or more computing devices configured to execute software instructions stored in memory to perform one or more processes consistent with the disclosed embodiments. For example, server 131 may include one or more memory device(s) storing data and software instructions and one or more processor(s) configured to use the data and execute the software instructions to perform server-based functions and operations known to those skilled in the art. Server 131 may be a general purpose computer, a mainframe computer, or any combination of these components. In certain embodiments, server 131 (or a system including server 111) may be configured as a particular apparatus, system, and the like based on the storage, execution, and/or implementation of the software instructions that perform one or more operations consistent with the disclosed embodiments. Server 131 may be standalone, or it may be part of a subsystem, which may be part of a larger system. For example, server 131 may represent distributed servers that are remotely located and communicate over a network (e.g., network 140) or a dedicated network, such as a LAN, for merchant 150.

In certain aspects, server 131 may include web server software that generates, maintains, and provides web site(s) for a respective merchant 130 that is accessible over network 140. In other aspects, server 131 may connect to separate web server(s) or similar computing devices that generate, maintain, and provide web site(s) for merchant 130. For example, merchant 130 may use web server(s) that provide a web site specific to merchant 130, and allows user 101 to access, view, and purchase goods and/or services from merchant 130.

Network 140 may be any type of network configured to provide communications between components of system 100. For example, network 100 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s), such as the exemplary links between server 111 and server 131.

Figure 2:
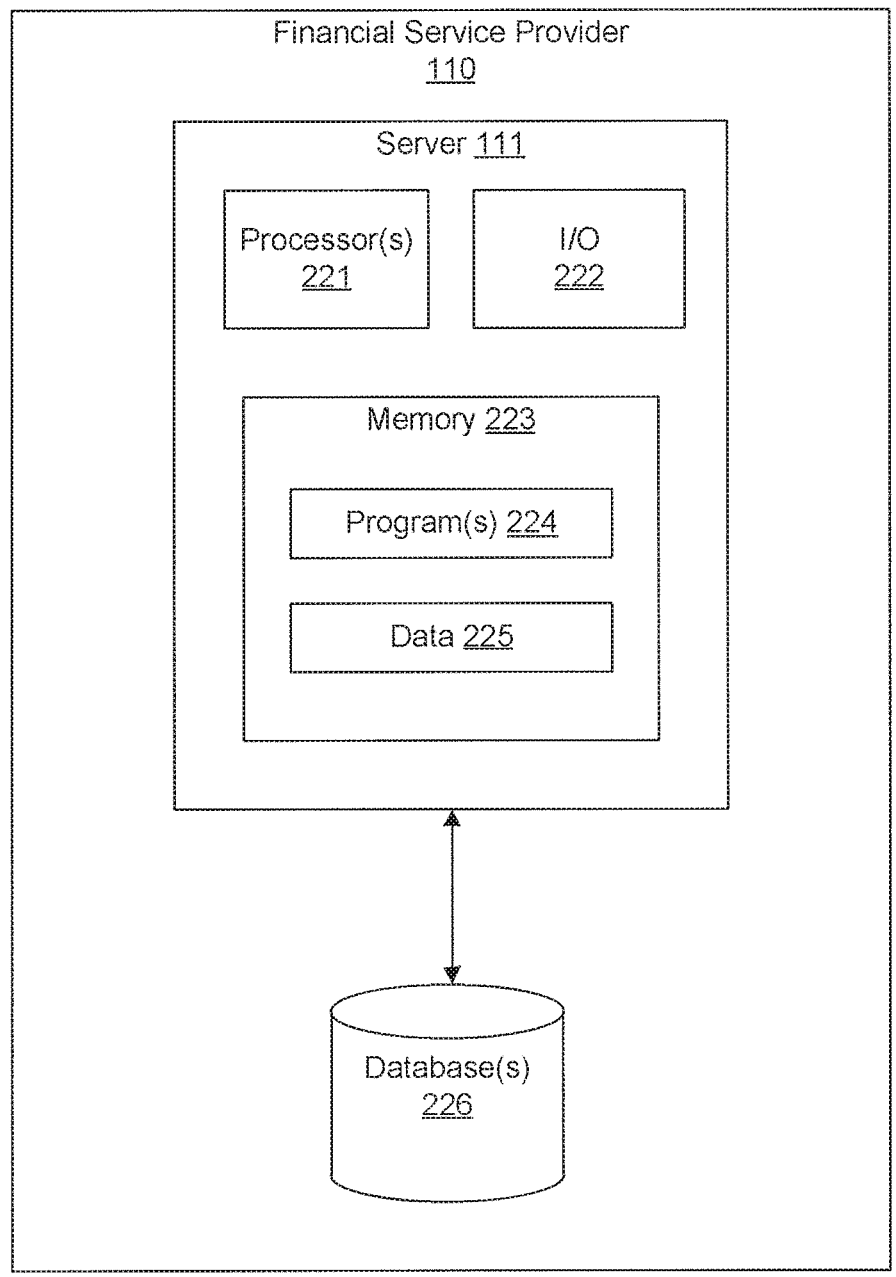
FIG. 2 is a block diagram of an exemplary financial service provider computing system, consistent with disclosed embodiments.

FIG. 2 shows an exemplary computing system including server 111 for financial service provider 110, consistent with certain disclosed embodiments. While depicted and described as server 111, it should be understood that the configuration and components of the computing system of FIG. 2 may additionally or alternatively represent that of server 131 of merchant 130, client device 120, and/or a component not shown in FIG. 1.

In one embodiment, server 111 may include one or more processors 221, one or more input/output (I/O) devices 222, and one or more memories 223. Alternatively, server 111 may take the form of a general purpose computer, a mainframe computer, or any combination of these components. In certain embodiments, server 111 (or a system including server 111) may be configured as a particular apparatus, system, and the like based on the storage, execution, and/or implementation of the software instructions that perform one or more operations consistent with the disclosed embodiments. Server 111 may be standalone, or it may be part of a subsystem, which may be part of a larger system.

Processor 221 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 111.

I/O devices 222 may be one or more device that is configured to allow data to be received and/or transmitted by server 111. I/O devices 222 may include one or more digital and/or analog communication devices that allow server 111 to communicate with other machines and devices, such as other components of systems 100.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor (s) 221. The disclosed embodiments are not limited to separate programs or computers configured to perform dedicated tasks. For example, memory 223 may include a single program 224 that performs the functions of the server 211, or program 224 could comprise multiple programs. Additionally, processor 221 may execute one or more programs located remotely from server 211. For example, financial service provider 110, via server 111, may access one or more remote programs that, when executed, perform functions related to certain disclosed embodiments.

Memory 223 may also store data 225 that may reflect any type of information in any format that the system may use to perform operations consistent with the disclosed embodiments.

Server 111 may also be communicatively connected to one or more database(s) 226. Server 111 may be communicatively connected to database(s) 226 through network 140. Database 226 may include one or more memory devices that store information and are accessed and/or managed through server 111. By way of example, database(s) 226 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 111 as exemplified in FIG. 2 may include database 226. Alternatively, database 226 may be located remotely from the server 111. Database 226 may include computing components (e.g., database management system, database server, etc.) configured to receive and process requests for data stored in memory devices of database(s) 226 and to provide data from database 226.

Figure 3:
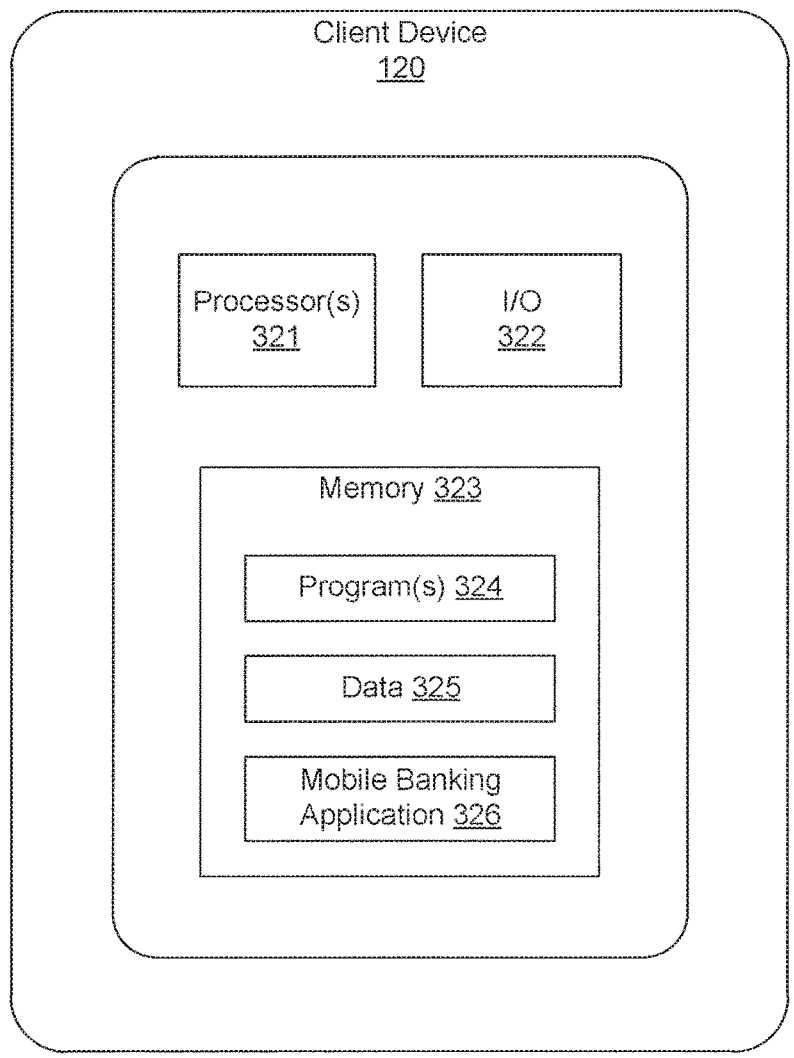
FIG. 3 is a block diagram of an exemplary client device computing system, consistent with disclosed embodiments.

FIG. 3 shows an exemplary client device 120 consistent with certain disclosed embodiments. In one embodiment, client device 120 may include one or more processors 321, one or more input/output (I/O) devices 322, and one or more memories 323. In one embodiment, client device 120 may take the form of a general purpose computer, a mainframe computer, or any combination of these components. In some embodiments, client device 120 may be a personal computing device, such as a smartphone, tablet, laptop, desktop computer, etc.

In certain embodiments, client device 120 (or a system including client device 120) may be configured as a particular apparatus, system, and the like based on the storage, execution, and/or implementation of the software instructions that perform one or more operations consistent with the disclosed embodiments. Client device 120 may be standalone, or it may be part of a subsystem, which may be part of a larger system.

Processor 321 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in client device 120.

I/O devices 322 may be one or more device that is configured to allow data to be received and/or transmitted by server 311. I/O devices 322 may include one or more digital and/or analog communication devices that allow server 311 to communicate with other machines and devices, such as other components of system 100.

Memory 323 may include one or more storage devices configured to store instructions used by processor 321 to perform functions related to the disclosed embodiments. For example, memory 323 may be configured with one or more software instructions, such as program(s) 324 that may perform one or more operations when executed by processor 321. The disclosed embodiments are not limited to separate programs or computers configured to perform dedicated tasks. For example, memory 323 may include a single program 324 that performs the functions of client device 120, or program 324 could comprise multiple programs. Additionally, processor(s) 321 may execute one or more programs located remotely from client device 120. For example, client device 120, may access one or more remote programs that, when executed, perform functions related to certain disclosed embodiments.

Memory 323 may also store data 325 that may reflect any type of information in any format that the system may use to perform operations consistent with the disclosed embodiments.

In certain embodiments, memory 323 may store a mobile banking application 326. Mobile banking application 326 may be one or more programs or software instructions that, when executed by processor(s) 321, perform one or more banking operations. For example, mobile banking application 326 may be a mobile application that is stored in a mobile device (e.g., client device 120) that performs operations and generates interface(s) that are displayed on a display device of client device 120. The interface(s) may be configured to present information and provide request(s) that elicit input from user 101. Client device 120 may be configured with known input hardware and software components that accept input from user 101 through known mobile device mechanisms, such as touch screen technologies, voice input, keypad entry, etc. Mobile banking application 326 may be configured to use information associated with the user 101 input to generate information, analyze and determine condition(s), generate results based on those condition(s), and provide data and interface(s) including the data. In certain aspects, mobile banking application 326 may be configured to perform one or more processes consistent with the disclosed embodiments, such as, for example, providing interfaces with options to allow a user to select a financial account for funding recent purchase transactions involving a multi-account card provided by financial service provider 110.

As described above, financial service provider 110 may provide and maintain one or more financial service accounts associated with a customer. Typically, each financial service account may be associated with one or more separate financial account products, such as a physical card that a user may carry on their person and use to perform financial service transactions at a point of sale (POS) terminal. With this typical configuration, a customer must select the financial account product associated with a particular account when initiating a transaction with a merchant (e.g., merchant 130). Consistent with disclose embodiments, instead of this typical process, a customer may use a multi-account card for all transactions, and select a financial service account for use in completing each transaction at a later time, or which may be selected automatically.

Figure 4:
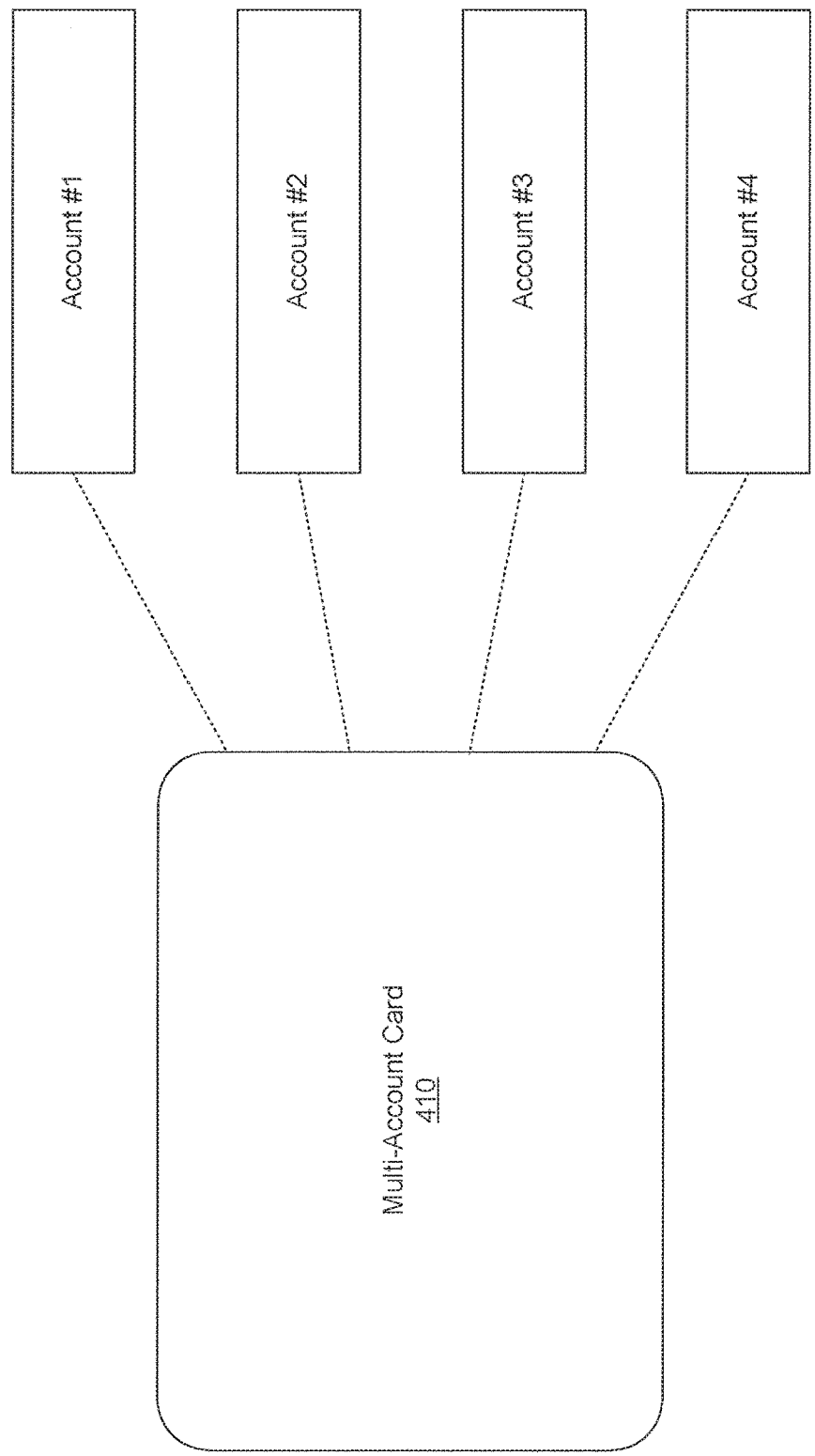
FIG. 4 is a diagram of an exemplary configuration of a multi-account card, consistent with disclosed embodiments.

FIG. 4 shows a diagram of an exemplary multi-account card 410, consistent with disclosed embodiments. As shown in FIG. 4, a single multi-account card 410 may be associated with a plurality of financial service accounts. Each financial service account may be a different financial service account held by the same customer (or at least accessible by a common customer). For example, the plurality of financial service accounts may include a checking account, savings account, credit account, business-expense account, personal expense account, etc. Each financial service account may have its own account characteristics (e.g., account type, credit limit, interest rate, agreement terms, etc.).

In an exemplary embodiment, a customer (e.g., user 101) may use multi-account card 410 at a POS terminal to conduct a financial transaction using one or more of the financial service accounts associated with the multi-account card 410. Financial service provider 110 (e.g., via server 111) may authorize the transaction, and an interaction between the customer and merchant 130 may be completed. In an exemplary embodiment, the customer may then select a financial service account for use in completing the transaction at a later time. In some embodiments, one or more components of system 100 (e.g., server 111) may automatically select a financial service account to be used in completing the transaction.

In an exemplary embodiment, multi-account card 410 may be associated with each financial service account such that, after identifying multi-account card 410, server 111 may configure and/or control any of financial service accounts. For example, server 111 may be configured to generate a pending transaction for any of financial service accounts.

In one embodiment, multi-account card 410 may be associated with a "ghost card" that corresponds to one or more of financial service accounts. The "ghost card" may be linked through server 111 (or another component of financial service provider 110) to each financial service account, such that generating a pending transaction for the "ghost card" may create a corresponding pending transaction for each associated financial service account.

Figure 5:
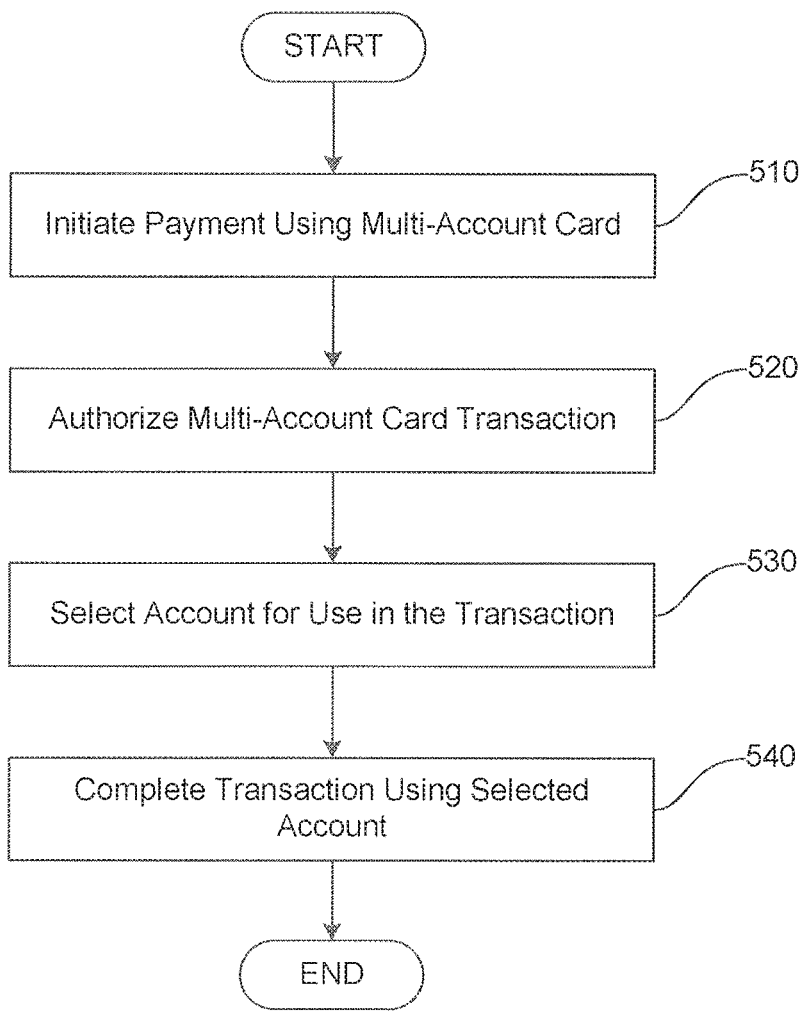
FIG. 5 is a flowchart of an exemplary multi-account card transaction process, consistent with disclosed embodiments.

FIG. 5 shows a flowchart of an exemplary multi-account card transaction process 500, consistent with disclosed embodiments. In one embodiment, one or more components of system 100, such as server 111, client device 120, and server 131, may perform one or more of the steps of process 500. In certain aspects, a customer (e.g., user 101) may obtain a multi-account card 410, which may be configured such that it is associated with each of the plurality of financial service accounts, which each may be held by the customer and be maintained by financial service provider 110. The customer may then use multi-account card 410 in a transaction, which may be completed through process 500.

Multi-account card transaction process 500 may include initiation of a payment using multi-account card 410 (step 510). In one embodiment, server 131, which may be connected to a POS device, may receive information about a transaction. For example, server 131 may receive information that includes information identifying the transaction (e.g., purchase amount) and information identifying multi-account card 410 (e.g., a multi-card account number). The POS device connected to server 131 may receive the information identifying multi-account card 410 in a conventional manner, such as by reading information stored in a magnetic strip on multi-account card 410 or some other communication system (e.g., RFID, Bluetooth®, WIFI, etc.). In some embodiments, merchant device 130 may also receive information identifying the customer (e.g., a pin number) and/or other information.

In an exemplary embodiment, server 131 may transmit the received transaction information to server 111, for example over network 140. Server 111 may use the transaction information to authorize the transaction (step 520). In one example, server 111 may authorize the transaction by determining whether the transaction meets authorization criteria for one or more of the financial service accounts. For example, server 111 may determine whether the transaction amount exceeds a limit (e.g., credit limits, daily spending limit, loan amount, etc.) for each financial service account. In another example, server 111 may compare transaction information to composite authorization criteria generated and stored based on the characteristics of financial service accounts (e.g., a limit based on the lowest limit of the accounts). It should be understood that the criteria under which the transaction may be authorized may vary, depending on the configuration of server 111 and the financial service accounts.

However, regardless of the manner in which authorization is determined, it should be understood that server 111 may determine that the transaction is authorized without identification of the particular financial service account that will be used to complete the transaction (e.g., fund a payment). If server 111 determines that a transaction is not authorized (or cannot be authorized without additional information), server 111 may proceed to notify merchant 130 and/or user 101 (and/or request and receive the additional information and re-attempt to authorize the transaction). Additional examples regarding authorization of transactions will be described in more detail below.

After server 111 authorizes the transaction, an interaction between the customer (e.g., user 101) and the merchant (e.g., merchant 130) may be complete. For example, a customer may leave a retail store with their purchase, leave a restaurant after a meal, enter an area requiring an entry fee, receive a requested service, etc. Before, during, or after this interaction, one or more components of system 100 may perform one or more processes to select a financial service account for use in completing the transaction (step 530). For example, client device 120 may receive input from user 101 indicating a selection, which may be transmitted to server 111. In other embodiments, server 111 and/or client device 120 may execute software instructions to perform a process to automatically select a financial service account. In some embodiments, an automatic selection may be made for each transaction, while an opportunity for user 101 to change the selection before the transaction is completed is maintained for a predetermined period of time.

With a financial service account selected, server 111 (and/or another component of system 100) may complete the transaction (step 540). For example, server 111 may execute software instructions to perform one or more processes to complete the transaction using the selected account. In one example, server 111 may perform a process to transfer funds from the selected financial service account to complete a payment from the customer to merchant 130.

Figure 6:
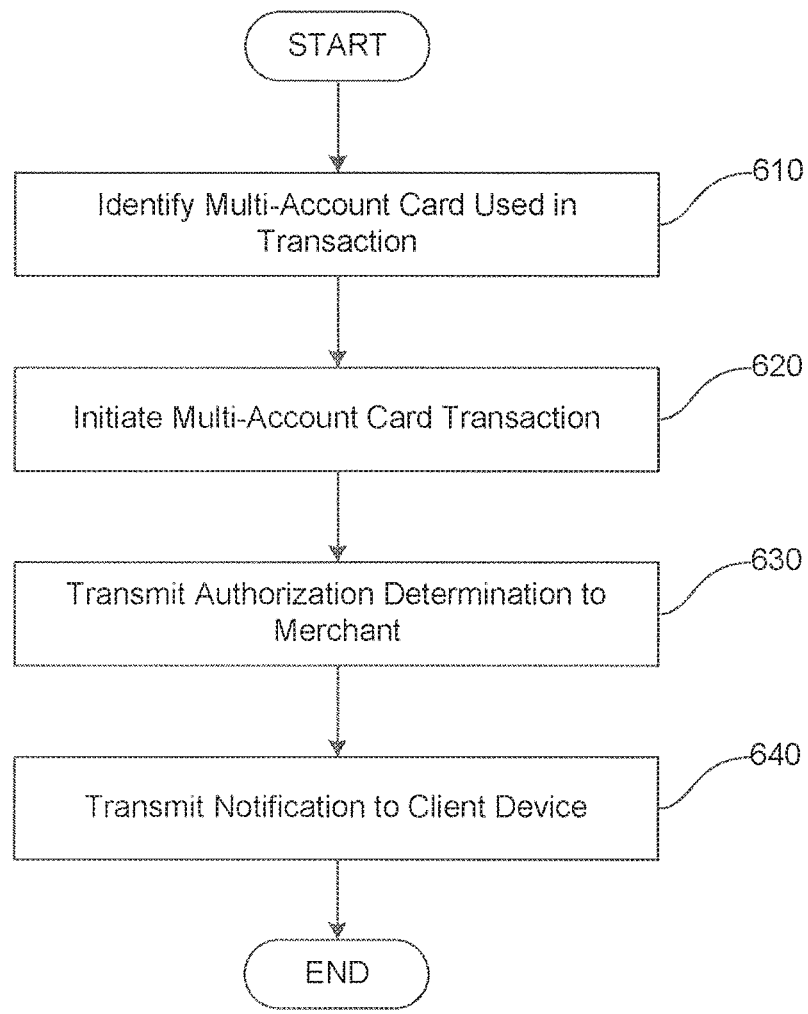
FIG. 6 is a flowchart of an exemplary multi-account transaction initiation process, consistent with disclosed embodiments.

FIG. 6 shows a flowchart of an exemplary multi-account card transaction authorization process 600. In some aspects, process 600 may correspond to step 520 of multi-account card transaction process 500. In one embodiment, server 111 may perform process 600 to authorize a transaction initiated by multi-account card 410 (or determine that the transaction is not authorized). It should be understood, however, that one or more other components of system 100 (shown or not shown) may perform one or more steps of process 600.

As was described in process 500, a customer may initiate a multi-account card transaction by using their multi-account card 410 at a POS device connected to server 131 of a merchant 130. Server 131 may receive information about the transaction, such as a transaction amount and information identifying multi-account card 410, and transmit the transaction information to server 111. Server 111 may receive and analyze the transaction information to identify the multi-account card 410 involved in the transaction (step 610). In some embodiments, server 111 may also identify the financial service accounts associated with the identified multi-account card 410.

Server 111 may use the transaction information to initiate a multi-account card transaction (step 620). In one embodiment, server 111 may initiate a transaction by determining whether the transaction would be authorized to complete with each financial service account. For example, server 111 may determine whether the transaction amount exceeds a limit associated with each financial service account. In another example, server 111 may determine whether the transaction information satisfies composite authorization criteria generated based on the characteristics of financial service accounts.

If the authorization criteria are met, server 111 may authorize the multi-account card transaction. For example, if server 111 determines that the transaction would be authorized on all of the financial service accounts, server 111 may authorize the multi-account card transaction. In an exemplary embodiment, server 111 may then generate a pending transaction with each financial service account, such as through the "ghost card" example described above.

However, if server 111 determines that the transaction is not authorized for one or more of financial service accounts (e.g., the transaction would exceed a credit limit of a credit card account), server 111 may determine that the multi-account card transaction is not authorized.

In some embodiments, server 111 may attempt to remedy a determination that a multi-account card transaction is not authorized by communicating with client device 120 (or server 131). For example, server 111 may provide a notification to client device 120, which client device 120 may use to indicate to user 101 the financial service accounts for which the transaction is authorized and the financial service accounts for which the transaction is not authorized. User 101 may input information to client device 120 that indicates that user 101 would like the transaction to continue using the financial service accounts for which the transaction is authorized, and which may include a selection of which financial service account to be used to complete the transaction. Alternatively, user 101 may input information to client device indicating that user 101 does not want the transaction to continue. Client device 120 may transmit the input information to server 111, which may subsequently generate a pending transaction with the financial service accounts for which the transaction is authorized (or only a selected financial service account), or may cancel the transaction altogether.

If, after the initial authorization determination or any subsequent determinations, server 111 determines that the multi-account card transaction is authorized, server 111 may transmit a notification to server 131 to inform merchant 130 of the authorization (step 630). If the transaction is not authorized, server 111 may also notify server 131 so that merchant 130 can stop the transaction. In an exemplary embodiment, server 111 may also transmit a notification to client device 120 (step 640). The notification received by client device 120 may include information identifying the authorized transaction, as well as the financial service accounts with which a transaction is pending, or, alternatively, that the transaction was not authorized (and possibly including reasons for the determination).

Figure 7:
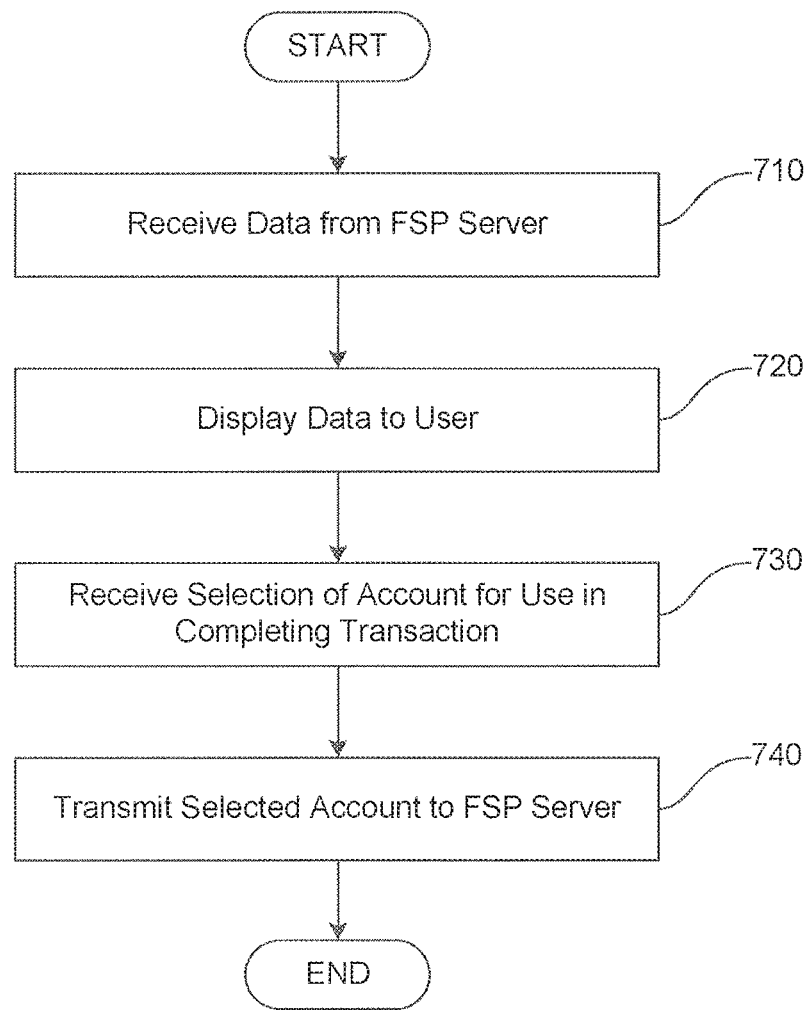
FIG. 7 is a flowchart of an exemplary account selection process, consistent with disclosed embodiments.

FIG. 7 shows a flowchart of an exemplary account selection process 700, consistent with disclosed embodiments. In some aspects process 700 may correspond to step 530 of multi-account card transaction process 500. In one embodiment, client device 120 may perform process 700 to provide server 121 with information regarding a financial service account to use to complete one or more authorized multi-account card transactions. In other embodiments, server 111 and/or server 131 may perform one or more steps of process 700.

Client device 120 may receive data from server 111 (step 710). The data may correspond to one or more authorized multi-account card transactions. For example, the data may identify various aspects of one or more transactions (e.g., the data may include the time and/or date of a transaction, an identifier of a merchant, and an amount of the transaction).

Client device 120 may next execute software instructions to display a notification to user 101 (step 720). For example, client device 120 may execute mobile banking application 326 to display data received from server 111.

In one embodiment, client device 120 may display an interface showing recently conducted transactions that have not yet been completed (e.g., the interface may include a list of the transactions or other identifiers, such as images, related to the transactions). These transactions may include transactions conducted using multi-account card 410, but for which a financial service account to be used to complete the transaction has not yet been selected by the customer. As described above, server 111 may have generated a pending transaction for each financial service accounts. Client device 120 may display each of these transactions, including information identifying each transaction (e.g., merchant information, transaction amount, etc.), to the customer via an interface associated with client device 120.

Client device 120 may receive input indicating a selection of a financial service account to be used in completing a displayed transaction (step 730). For example, user 101 may operate client device 120 to select a displayed transaction and input information to select one of financial service accounts (each of which have been authorized to complete the transaction and for which a pending transaction was generated) to be used to complete the selected transaction. For instance, user 101 may select a restaurant transaction and select their debit card account to fund the transaction.

In one embodiment client device 120 may display a list of a plurality of recent transactions (e.g., transactions that occurred that day, within the last 24 hours, etc.). User 101 may operate client device to select a financial service account for use in completing one or more of the transactions. In another embodiment, client device 120 may display a "push" notification associated with a single transaction that recently occurred, requesting that user 101 select a financial service account for the transaction. For example, after user 101 completes a retail purchase at a merchant 130, client device 120 may receive and display a notification requesting user 101 select a financial service account to fund the purchase.

In some embodiments, server 111 and/or client device 120 may determine a default financial service account to associate with each transaction. For example, user 101 may indicate that a credit card account should be used as a default account for each transaction. In these embodiments, client device 120 may indicate a default financial service account that will be used for the transaction if user 101 does not select another financial service account within a particular period of time. In some embodiments, default accounts may be designated for certain kinds of transactions. For example, user 101 may establish preferences associated with a profile of user 101 that designate default accounts based on transaction type (e.g., designate a default account for types of transactions such as restaurant purchases, supermarket purchases, entertainment purchases, travel purchases, gas purchases, retail sales purchases, online purchases, etc.). User 101 may further or in the alternative designate default accounts based on when the purchase is made (e.g., use a default account associated with business expenses for purchases made during certain days and/or times). After client device 120 receives a selection of a financial service account, client device 120 may transmit a notification including the selection to server 111 (step 740). The notification may indicate which financial service account should be used for one or more transactions that have not yet been completed. In one embodiment, client device 120 may transmit the notification shortly after the selection is received. In another embodiment, client device 120 may transmit a list of one or more selections at a predetermined time, such as at the end of the day. In some embodiments, client device 120 may transmit information indicating that a selection has not yet been made for one or more transactions, such as after a predetermined time period.

Figure 8:
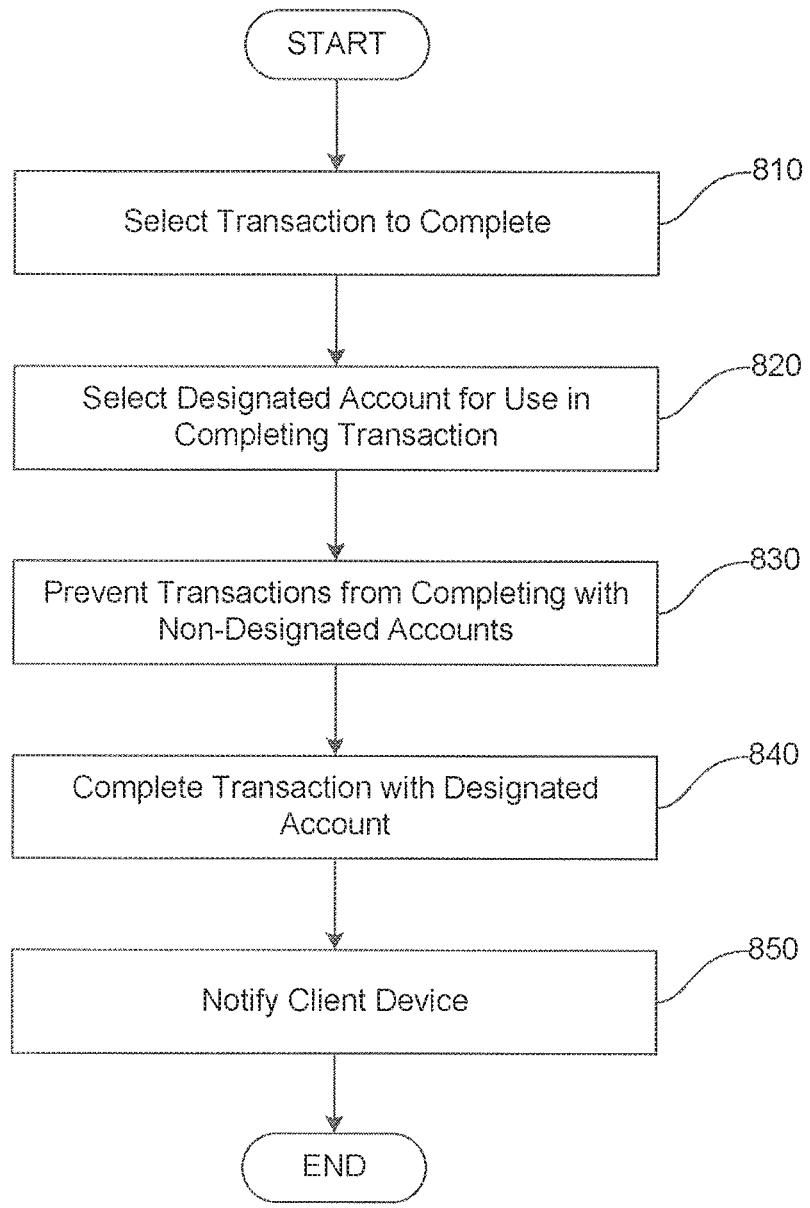
FIG. 8 is a flowchart of an exemplary transaction completion process, consistent with disclose embodiments.

FIG. 8 shows a flowchart of an exemplary transaction completion process 800, consistent with disclosed embodiments. In certain aspects, process 800 may correspond to step 540 of multi-account card transaction process 500. In one embodiment, server 111 may perform process 800 to complete one or more transactions that were conducted using multi-account card 410. For example, server 111 may use information about the transaction and/or information regarding selection of a financial service account to complete the transaction with only one of the financial service accounts for which a pending transaction was generated.

Server 111 may select a transaction to complete (step 810). In one embodiment, server 111 may select a transaction to complete after receiving selection of a financial service account to be used in completing the transaction from client device 120. In another embodiment, server 111 may select a transaction to complete after a predetermined period since the transaction was initiated has passed (e.g., after 24 hours, 48 hours, etc.).

Server 111 may determine a financial service account as a designated account to be used to complete the transaction (step 820). In one example, server 111 may select as the designated account a financial service account that was selected by user 101 and transmitted to server 111 from client device 120. In another example, server 111 may determine that an automatic selection of a default financial service account should be used to as the designated account, such as after a predetermined time period has passed without receiving a selection from client device 120, or based on a customer setting indicating that automatic selection should be used without additional input from the customer.

Automatic selection of a default account may be based on a previous selection of a financial service account to be the default account. For example, user 101 may select their credit card account as their default account. In another example, automatic selection of a default account may occur based on stored customer settings. For example, server 111 may compare information about a transaction with stored customer settings to determine which financial service account should be selected as the default account. The customer settings may indicate the criteria under which a particular financial service account should be automatically selected. The criteria may include information regarding particular merchants, merchant categories, transaction amounts, time periods, locations, and the like. For example, customer settings may indicate that a debit account should be selected as the default account for all transaction with transaction amounts below a threshold. In another example, customer settings may indicate that a business card account should be selected as the default account for all transactions over a certain period of time (e.g., a period of time corresponding to a business trip). Through the customer settings and automatic selection of a default account by server 111, transactions may be completed using an appropriate account even when user 101 does not provide a selection.

After server 111 determines which financial service account to be the designated account for use in completing a transaction, server 111 may prevent pending transaction with non-designated accounts from being completed (step 830). For example, server 111 may execute software instructions to perform one or more processes to cancel any pending transactions with financial service accounts that are not the designated account determined in step 820. In this way, the transaction will not be completed using more than one financial service account (and the customer will not pay twice for a transaction).

Server 111 may complete the transaction using the designated account determined in step 820 (step 840). In one embodiment, server 111 may allow the pending transaction with the designated financial service account to automatically complete, such as through typical payment processing procedures. In another embodiment, server 111 may send a notification to another component of financial service provider 110 indicating that the transaction can be completed using the designated account. Server 111 (or another component of system 100) may transfer funds from the designated account to an appropriate destination (e.g., a merchant account) to complete the transaction.

In some embodiments, server 111 may transmit a notification to client device 120 indicating that the transaction was completed using the designated financial service account (step 850). Client device 120 may display the notification to user 101, such as through mobile banking application 326.

Figure 9:
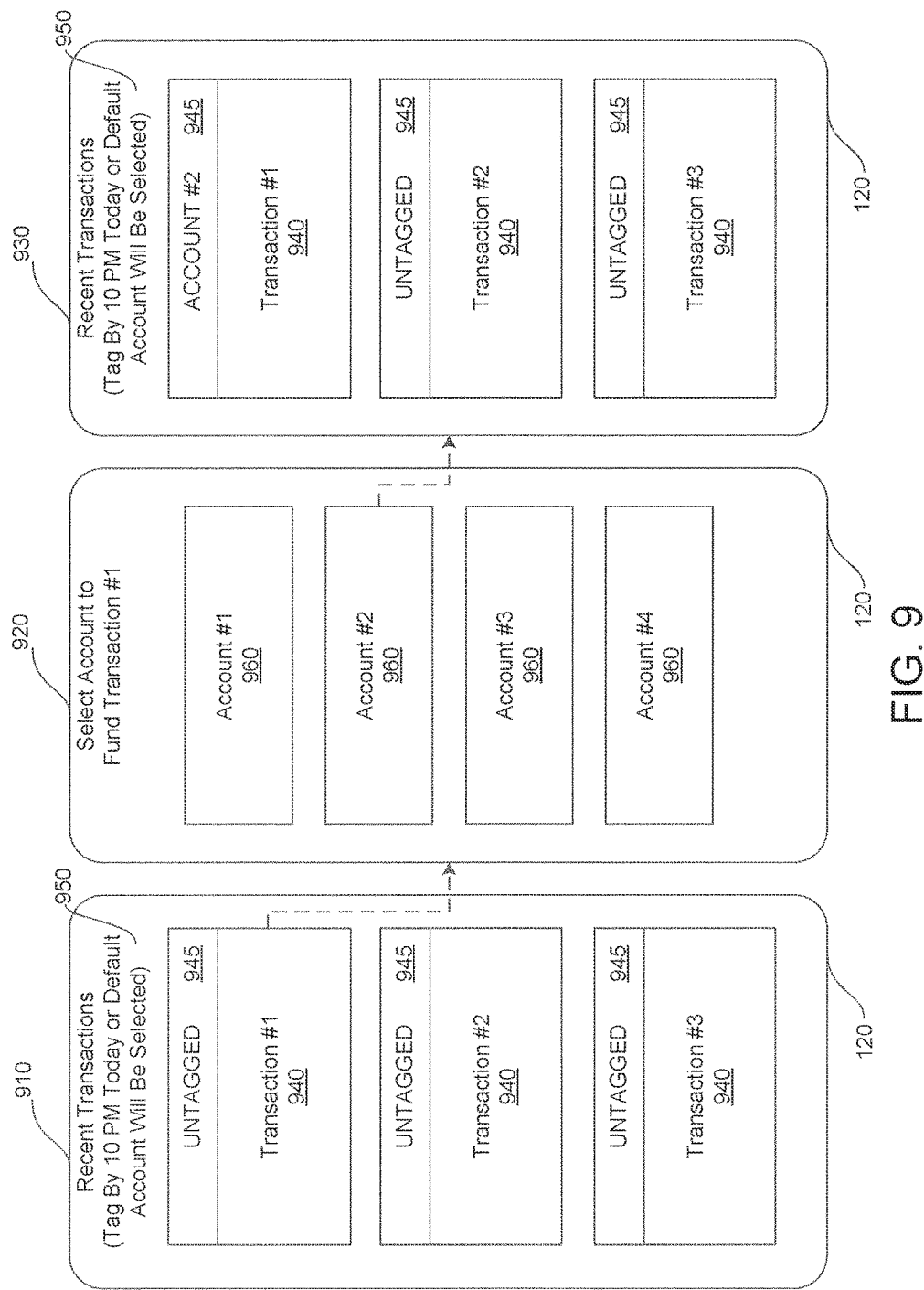
FIG. 9 is a block diagram of exemplary interfaces associated with account selection processes consistent with certain disclosed embodiments.

FIG. 9 shows a block diagram of exemplary interfaces 910, 920, and 930, consistent with disclosed embodiments. In one embodiment, client device 120 may display interfaces 910, 920, and 930 to user 101 to allow user 101 to select a financial service account to be used to complete a plurality of recent transactions. For example, client device 120 may execute mobile banking application 326 to generate and display interfaces 910, 920, and 930 on a mobile device (e.g., smartphone or tablet). It should be understood, however, that other configurations of client device 120 and interfaces 910, 920, and 930 are possible, such as a website interface displayed by a computing device, such as a laptop or desktop computer.

As shown in FIG. 9, interface 910 may display a list of recent transactions 940 to user 101. In an exemplary embodiment, each transaction 940 may be a multi-account card transaction that was conducted using multi-account card 410 and authorized by server 111. Each transaction 940 may include descriptive information, such as merchant information, transaction amount, time/day information, location information, etc., such that user 101 may easily recognize the transaction.

In an exemplary embodiment, each displayed transaction 940 may be associated with a tag 945. Each tag 945 may indicate a financial service account that has been selected (either by user 101 or automatically by server 111 and/or client device 120) as the financial service account that will be used to complete the transaction, or, as shown in interface 910, may indicate that a transaction is untagged (e.g., a financial service account has not yet been selected). As shown in FIG. 9, interface 910 may also include an expiration warning 950 for the listed transactions. Expiration warning 950 may indicate a time that a default financial service account will be selected if user 101 does not input a selection.

In an exemplary embodiment, user 101 may operate client device 120 to select a transaction 940 from the list of transactions display by interface 910. For example, client device 120 may receive input indicating "Transaction #1" was selected, which is a transaction 940 that is tagged as unfiled. In one example, "Transaction #1" may be a retail purchase made at a clothing store. Based on the selection of the transaction 940, client device may execute software instructions to generate interface 920.

As shown in FIG. 9, interface 920 may display a list of financial service accounts 960. In an exemplary embodiment, financial service accounts 960 may correspond to financial service accounts. In some embodiments, financial service accounts 960 may only correspond to those financial service accounts for which the transaction was previously determined to be authorized and a pending transaction was generated. Interface 920 may list financial service accounts 960 and prompt user 101 to select a financial service account 960 to fund the selected transaction 940 (in this case "Transaction #1").

In an exemplary embodiment, user 101 may operate client device 120 to select a financial service account 960 to be used to complete "Transaction #1". For example, client device 120 may receive input indicating that "Account #2" was selected. In the example described above, "Account #2" may be a personal debit account, which user 101 may select as appropriate to fund their retail purchase at the clothing store. Based on the selection of the financial service account 960, client device 120 may generate interface 930.

As shown in FIG. 9, interface 930 may again display the list of recent transactions 940 displayed by interface 910. However, as shown, the previously selected transaction 940 (in this case "Transaction #1") may indicate the selected financial service account 960 in tag 945. In this way, client device 120 may indicate to user 101 that the transaction 940 has been tagged and the transaction 940 will be completed using the selected financial service account 960.

In an exemplary embodiment, user 101 may proceed to operate client device 120 to select each remaining untagged transaction 940 and select a financial service account 960 for each. In some embodiments, user 101 may select a previously tagged (either manually or automatically) transaction 940 and change the selected financial service account 960.

In an exemplary embodiment client device 120 may transmit a notification to server 111 indicating the financial service account that was selected for one or more multi-account card transactions. For example, client device 120 may transmit a notification to server 111 indicating selections (or lack thereof) for transactions 940 for which the expiration time has passed. In another example, client device 120 may transmit a notification to server 111 immediately after a selection is made and/or at the request of user 101. Server 111 may receive a notification from client device 120 and proceed to complete one or more transactions, such as through transaction completion process 800 described above.

In an alternative embodiment, multi-account card 410 may be associated with its own separate financial service account. For example, multi-account card 410 may be associated with a separate line-of-credit account with its own account characteristics (e.g., credit limit). Server 111 may associate the separate account with each other financial service account and be configured to transfer a balance from the separate account to one or more of the other financial service accounts. Server 111 may determine whether a multi-account card transaction is authorized based on whether the transaction is authorized for the separate financial service account. If the transaction is authorized, server 111 may generate a pending transaction with the separate account. Server 111 may then transfer the balance of the pending transaction to a financial service account, such as based on a selection from user 101 and/or an automatic selection process. If no selection is made, the server 111 may process the transaction using the separate financial service account.

The exemplary disclosed embodiments allow a customer to use a multi-account card to conduct transactions. Each transaction may be authorized without a specific selection of a financial service account that will be used to complete the transaction. Sometime after the transaction between the customer and the merchant occurs, the customer may consider the transaction and select an appropriate financial service account to be used in completing it (e.g., selecting a business-expense account for a business expense and/or selecting a personal account for a personal expense). In this way, a customer may quickly and easily conduct transactions without considering which financial service account should be used for the transaction and/or without risking making an incorrect selection (e.g., using a business-expense account for a personal purchase). Further, in some embodiments, automatic selection of a financial service account may occur, further reducing the need for the customer to consider which financial service account to use, and thereby simplifying and improving the customer experience.

The exemplary disclosed embodiments describe systems and methods for providing a multi-account card. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Alternatively, the disclosed embodiments may implement a specialized apparatus or system configured to execute software programs that perform processes consistent with the disclosed embodiments.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for conducting a transaction, comprising:
   one or more memory devices storing instructions; and
   one or more processors configured to execute the instructions to:
   receive information associated with a transaction initiated using a multi-account card, the multi-account card being associated with a plurality of accounts;
   determine for each of the plurality of accounts whether the transaction is authorized by that account;
   when the transaction is authorized by more than one of the plurality of accounts:
   generate a pending transaction for each authorized account to complete a purchase from a merchant;
   maintain an opportunity for a period of time for a user to select one of the plurality of authorized accounts to complete the transaction after completing the purchase;
   transmit for display on a graphical user interface of a client device of the user, information regarding the pending transaction and an option for the user of the client device to select each of the authorized accounts;
   receive, from the client device, a selection by the user of one of the authorized accounts;
   complete the transaction upon receiving the selection of one of the authorized accounts from the client device; and
   cancel pending transactions created for authorized accounts not selected by the user to complete the transaction.

2. The system of claim 1, wherein when the transaction is authorized by fewer than all of the plurality of accounts, prompt the user to select an account from the authorized accounts to complete the transaction.

3. The system of claim 1, wherein when the transaction is authorized by each of the plurality of accounts, the one or more processors is further configured to execute the instructions to transmit data to a client device, the data including instructions to prompt for the user to select an account from the plurality of accounts to complete the transaction if a selection has not been made within the period of time.

4. The system of claim 3, wherein the one or more processors is further configured to execute the instructions to receive, from the client device, a selected account.

5. The system of claim 4, wherein the one or more processors is further configured to execute the instructions to complete the transaction upon receiving the selected account.

6. The system of claim 3, wherein the one or more processors is further configured to execute the instructions to cancel the transaction when no selection is made in response to the prompt.

7. The system of claim 1, wherein the one or more processors is further configured to execute the instructions to select a default account of the plurality of accounts to complete the transaction.

8. The system of claim 7, wherein the one or more processors is configured to execute the software instructions to select the default account based on the information associated with the transaction.

9. The system of claim 7, wherein the one or more processors is configured to execute the software instructions to select the default account based on user profile information associated with the multi-account card.

10. The system of claim 9, wherein the user profile information comprises preference information of a user of the multi-account card.

11. A computer-implemented method for conducting a transaction, comprising:
    receiving, by one or more processors, information associated with a transaction initiated using a multi-account card, the multi-account card being associated with a plurality of accounts;
    determining, by the one or more processors, for each of the plurality of accounts whether the transaction is authorized by that account;
    when the transaction is authorized by more than one of the plurality of accounts:
    generating, by the one or more processors, a pending transaction for each authorized account to complete a purchase from a merchant;
    maintaining, by the one or more processors, an opportunity for a period of time for a user to select one of the plurality of authorized accounts to complete the transaction after completing the purchase;
    transmitting for display on a graphical user interface of a client device of the user, information regarding the pending transaction and an option for the user of the client device to select each of the authorized accounts;
    receiving, from the client device, a selection by the user of one of the authorized accounts;
    completing, by the one or more processors, the transaction upon receiving the selection of one of the authorized accounts from the client device; and
    cancelling, by the one or more processors, pending transactions created for authorized accounts not selected by the user to complete the transaction.

12. The computer-implemented method of claim 11, wherein when the transaction is authorized by fewer than all of the plurality of accounts, prompting, by the one or more processors, the user to select an account from the authorized accounts to complete the transaction.

13. The computer-implemented method of claim 11, wherein when the transaction is authorized by each of the plurality of accounts, the method further comprises:
    transmitting data to a client device, the data including instructions to prompt for the user to select an account from the plurality of accounts to complete the transaction if a selection has not been made within the period of time.

14. The computer-implemented method of claim 13, further comprising:
    receiving, from the client device, a selected account.

15. The computer-implemented method of claim 13, further comprising:
    cancelling the transaction when no selection is made in response to the prompt.

16. The computer-implemented method of claim 11, further comprising:
selecting a default account of the plurality of accounts to complete the transaction.

17. The computer-implemented method of claim 16, further comprising:
selecting the default account based on the information associated with the transaction.

18. The computer-implemented method of claim 16, further comprising:
selecting the default account based on user profile information associated with the multi-account card.

19. The computer-implemented method of claim 18, wherein the user profile information comprises preference information of a user of the multi-account card.

20. A non-transitory computer-readable medium storing instructions that, when executed by a processor, cause the processor to perform operations comprising:
receiving information associated with a transaction initiated using a multi-account card, the multi-account card being associated with a plurality of accounts;
determining for each of the plurality of accounts whether the transaction is authorized by that account;
when the transaction is authorized by more than one of the plurality of accounts:
generating a pending transaction for each authorized account to complete a purchase from a merchant;
maintaining an opportunity for a period of time for a user to select one of the plurality of authorized accounts to complete the transaction after completing the purchase;
transmitting for display on a graphical user interface of a client device of the user, information regarding the pending transaction and an option for the user of the client device to select each of the authorized accounts;
completing the transaction upon receiving the selection of one of the authorized accounts from the client device; and
cancelling, by the one or more processors, pending transactions created for authorized accounts not selected by the user to complete the transaction.

* * * * *